(12) United States Patent
Tanaka

(10) Patent No.: US 6,667,765 B1
(45) Date of Patent: Dec. 23, 2003

(54) IMAGE PICKUP APPARATUS

(75) Inventor: Toshiyuki Tanaka, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/368,650

(22) Filed: Aug. 5, 1999

(30) Foreign Application Priority Data

Aug. 6, 1998 (JP) .......................................... 10-223152

(51) Int. Cl.[7] .............................................. H04N 5/235
(52) U.S. Cl. ................................. 348/229.1; 348/362
(58) Field of Search .......................... 348/221.1, 297, 348/362, 296, 367, 363, 364, 229.1

(56) References Cited

U.S. PATENT DOCUMENTS

| 4,635,126 | A | * | 1/1987 | Kinoshita | ................ 348/229.1 |
| 5,258,848 | A | * | 11/1993 | Kondo et al. | ............. 348/229.1 |
| 5,448,293 | A | * | 9/1995 | Kogane et al. | ........... 348/229.1 |
| 5,579,049 | A |   | 11/1996 | Shimaya et al. | ............. 348/364 |
| 5,745,808 | A | * | 4/1998 | Tintera | ..................... 348/229.1 |

* cited by examiner

Primary Examiner—Wendy R. Garber
Assistant Examiner—Rashawn N. Tillery
(74) Attorney, Agent, or Firm—Sidley Austin Brown & Wood LLP

(57) ABSTRACT

In an image pickup apparatus such as a digital camera with a display serving as a viewfinder, exposure is controlled by changing only an exposure time of an image pickup device without changing size of an aperture for taking an image for the viewfinder. When the exposure time of the image pickup device is insufficient to obtain a proper density of the image, the image signals of the image pickup device is amplified for compensating the insufficient exposure.

5 Claims, 11 Drawing Sheets

IMAGE PICKUP APPARATUS

This application is based on patent application Hei.10-223152 filed in Japan, the content of which is hereby incorporated by references.

BACKGROUND OF THE INVENTION

1. Field of the Invention

This invention relates to an image pickup apparatus for photoelectrically transferring optical energy of an image to electric signals as image data and recording the image data into a recording medium after processing predetermined image processing.

2. Description of the Related Art

This type of equipment with image pickup apparatus is described below by taking a digital camera as an example.

A digital camera (hereinafter abbreviated as camera) generally has no mechanical shutter in order to downsize and to simplify the camera. Exposure of the camera is controlled by not only varying exposure time (charge storage time) of an image pickup device such as CCD (Charge Coupled Device), but also varying a size or an area of an aperture mechanism. The camera calculates a proper exposure time t and the size of the aperture by a predetermined program corresponding to a luminance of an object.

On the other hand, in the camera using the image pickup device, it is impossible to control the exposure control time t' as an optional value, since the exposure time of the image pickup device is governed by a scanning time $tr_0$ for one horizontal line of the image pickup device. Thus, the camera uses the scanning time $tr_0$ for one horizontal line of the image pickup device as a standard time unit for calculating an exposure control time t'. Hereupon, $tr_0=1/(30\times512)\approx65$ μs. The camera calculates the exposure control time t' by integral multiply of the standard time unit $tr_0$.

When an exposure value EV corresponding to the luminance of the object is 15 (EV=15) and an aperture value AV corresponding to the size of the aperture is 4 (AV=4), a time value TV corresponding to the proper exposure time t becomes 11 (TV=EV−AV=15−4=11). The proper exposure time t corresponding to the time value TV=11 becomes 1/2048 sec.

On the other hand, the camera selects a time of $7/(30\times512)\approx1/2194$ sec which is the nearest time to the proper exposure time t as the exposure control time t' of the image pickup device. When the exposure control time t'=1/2194 sec is converted to an exposure control time value TV' of an APEX time value, the exposure control time value TV' becomes 11.1 (TV'=11.1). Therefor, an error component ΔTVe=TV'−TV=0.1 occurs.

When the error component ΔTVe is smaller than an exposure control step ΔEV which is, for example, ⅕(=0.2), there is no problem in the density of an image displayed on a monitor display. Thus, the photoelectric transferring operation of the image pickup device is controlled by using the exposure control time t' or the exposure control time value TV'.

In view of further downsizing and simplifying the digital camera, it is proposed to use the monitor display such as LCD (Liquid Crystal Display) as a viewfinder. In such a camera, it is proposed to fix the size of the aperture immovably and to control the exposure by only varying the exposure control time t' of the image pickup device when an image is taken for smoothly displaying on the monitor display serving as the viewfinder.

The camera, however, can select the exposure control time t' calculated by multiplying an integer on the standard time unit $tr_0$. Thus, when the exposure is controlled by varying the exposure control time t' of the image pickup device without varying the size of thee aperture, the exposure cannot be controlled properly, especially in a highlight scene in which the exposure control time t' calculated by the luminance of the object becomes shorter than the standard time unit $tr_0$.

Alternatively, even when a plurality of the exposure control time t' can be selected by using another time unit tr shorter than the standard time unit $tr_0$ for realizing a delicate exposure control, an error component Δt between the proper exposure time t and the exposure control time t' becomes larger than the time unit tr in a highlight scene, so that the exposure cannot be controlled properly in the highlight scene.

Furthermore, it is assumed that the exposure control time t' can be variable by 1/8 TV. When the exposure value EV is equal to or larger than 15 (EV=15) in the above-mentioned example, the error component ΔTVe between the proper exposure time value TV and the exposure control time value TV' becomes larger than 1/8. Thus, the exposure control time value TV' cannot be varied substantially. For example, with respect to EV=15.625 to 15.875 in a table 1 shown below, values of the proper exposure time value TV correspond to 11.625 to 11.875. However, the exposure control time value TV' which can be selected and smaller than the proper exposure time value TV is 11.907 (t'=4/(30×512) sec). Thus, the exposure control time value TV' of the image pickup device is not varied in a region of the exposure value EV=15.625 to 15.875.

TABLE 1

| EV | TV | Integer | TV' | ΔTVe |
| --- | --- | --- | --- | --- |
| 15.500 | 11.500 | 5 | 11.585 | 0.085 |
| 15.625 | 11.625 | 4 | 11.907 | 0.282 |
| 15.750 | 11.750 | 4 | 11.907 | 0.157 |
| 15.875 | 11.875 | 4 | 11.907 | 0.032 |
| 16.000 | 12.000 | 3 | 12.322 | 0.322 |

Furthermore, when the time value TV=14 is converted to an actual exposure time, it becomes nearly equal to 0.94/(30×512) sec which is shorter than the standard time unit $tr_0=1/(30\times512)$ sec. Thus, the exposure control time t', which can be selected in the highlight scene equal to or higher than TV=14, becomes a constant value of 1/(30×512) sec, so that all images in the highlight scene will be over-exposed.

SUMMERY OF THE INVENTION

An object of this invention is to provide an image pickup apparatus by which an image with a proper density of colors can be taken even when an aperture is immovable and only an exposure time of an image pickup device is controlled.

An image pickup apparatus in accordance with this invention comprises an image sensor for photoelectrically converting optical energy of an image of an object to electric signals; a detector for sensing a luminance of the object; a first setter for setting a first exposure time which is calculated by integral multiply of a first time unit corresponding to the luminance sensed by the detector; a second setter for setting a second exposure time which is calculated by integral multiply of a second time unit shorter than the first time unit corresponding to the luminance sensed by the detector; a calculator for calculating a value of signal amplification due to a difference between the first exposure time and the second exposure time; and an amplifier for amplifying image signals obtained by exposing the image sensor by the first exposure time based on the value of the signal amplification calculated by the calculator.

By the above-mentioned configuration, an image having a proper density can be obtained without using adjustable aperture mechanism and shutter mechanism.

DETAILED DESCRIPTION OF THE EMBODIMENT

An embodiment of an image pickup apparatus in accordance with this invention is described.

An can be seen from FIGS. 1 to 6, a digital camera 1 of the embodiment is configured by a box-shaped camera body 2 and a column-shaped image pickup unit 3. Hereinafter, the digital camera 1 is abbreviated as camera 1. The image pickup unit 3 is mounted at a mounting portion 3B and rotatable around a rotation axis perpendicular to a left side wall 2A of the camera body 2. A housing 3A of the image pickup unit 3 has substantially the same height and thickness as those of a housing of the camera body 2. In the figures, an optical axis of an optical lens system of the image pickup unit 3 stands parallel to the left side wall 2A of the camera body 2. This posture is called a standard position of rotation of the image pickup unit 3. The image pickup unit 3 can be rotated more than 90 degrees in both directions from the standard position of rotation.

Figure 6:
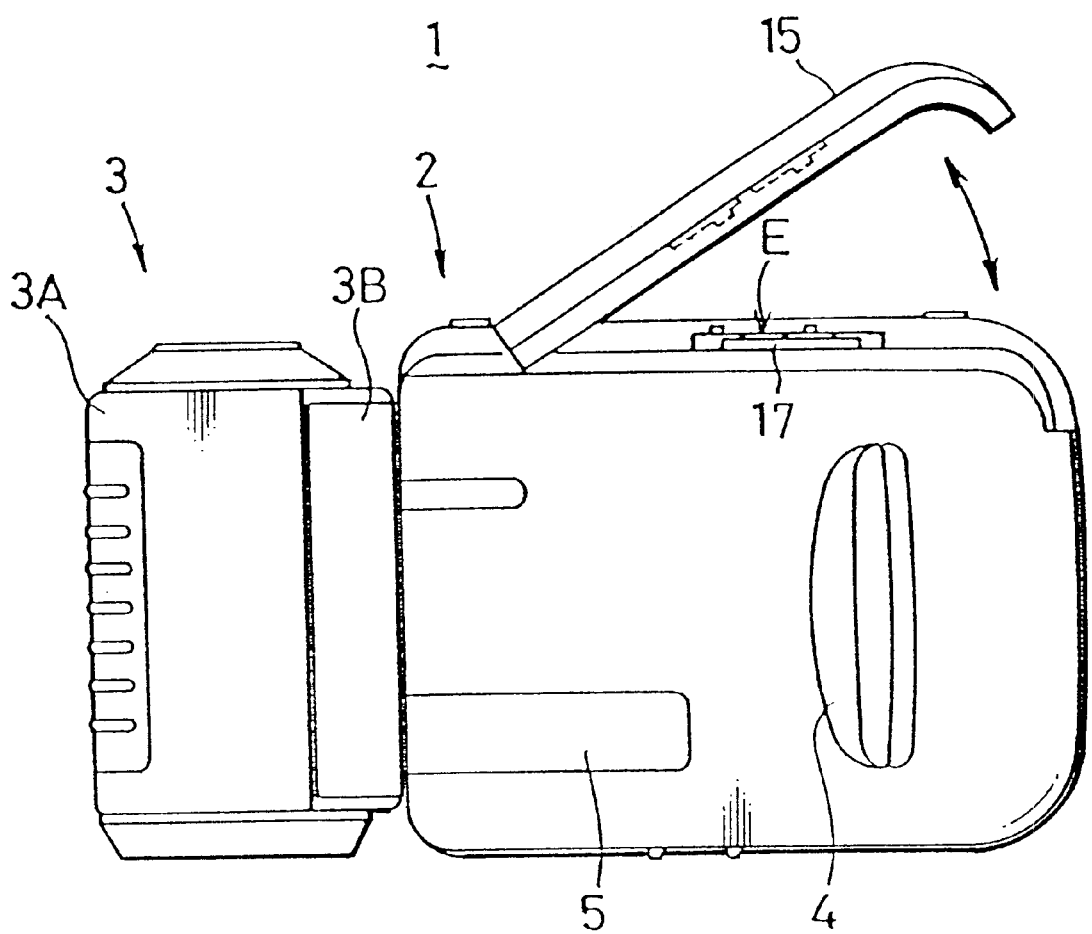
FIG. 6 is a front view of the digital camera which is turned upside down for opening a lid of a battery cavity and a memory card cavity.
Figure 7:
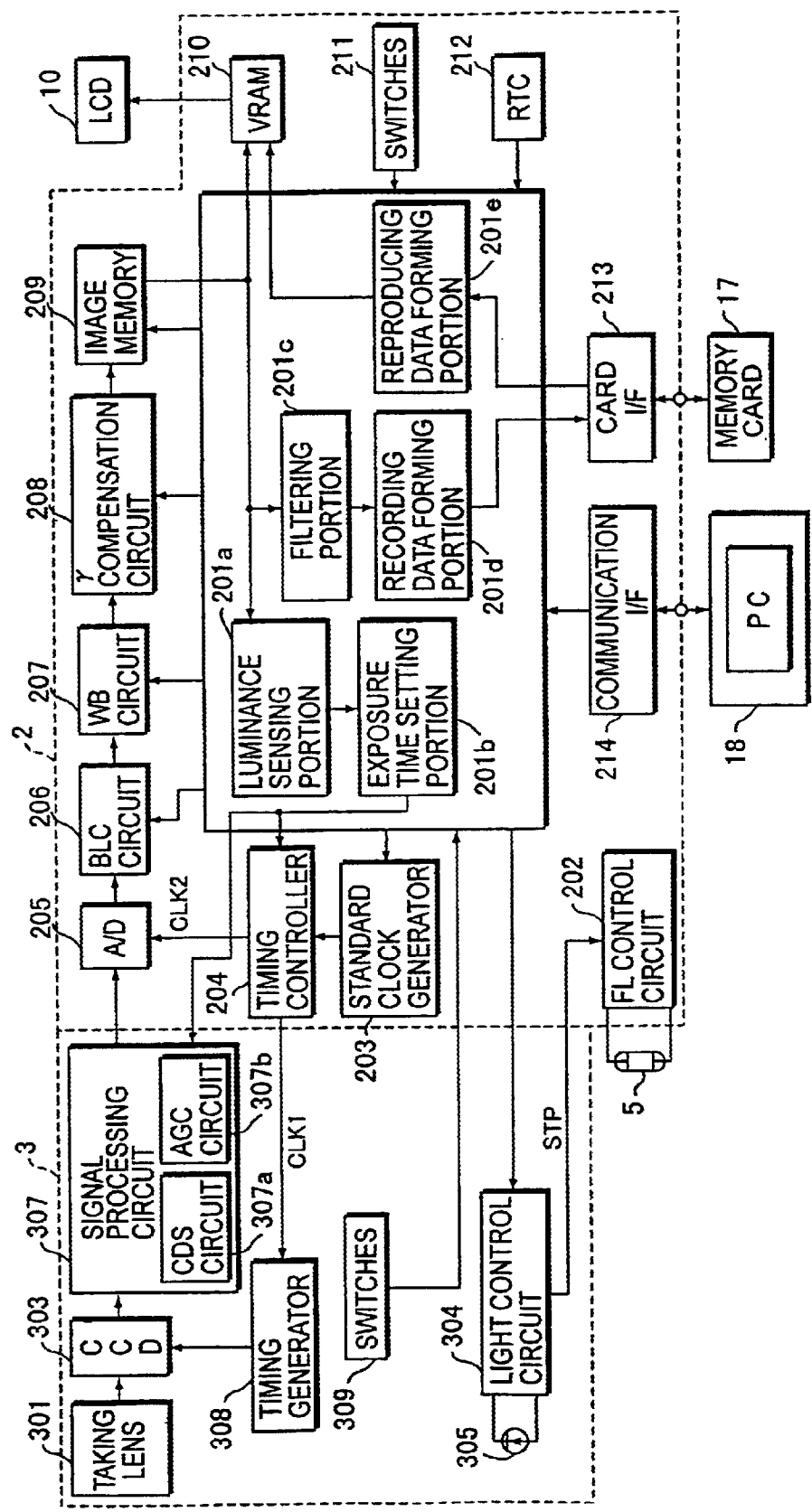
FIG. 7 is a block diagram showing a configuration of the digital camera.

The camera body 2 comprises a monitor display 10 such as LCD, a memory card recorder for a memory card 17 (see FIG. 6), and a connector terminal 13 by which the camera is connected to a personal computer (PC) 18 (see FIG. 7). The image data taken by the image pickup unit 3 is processed by predetermined signal processing, displayed on the monitor display 10, recorded on the memory card 17, and transmitted to the personal computer 18, if necessary.

Figure 1:
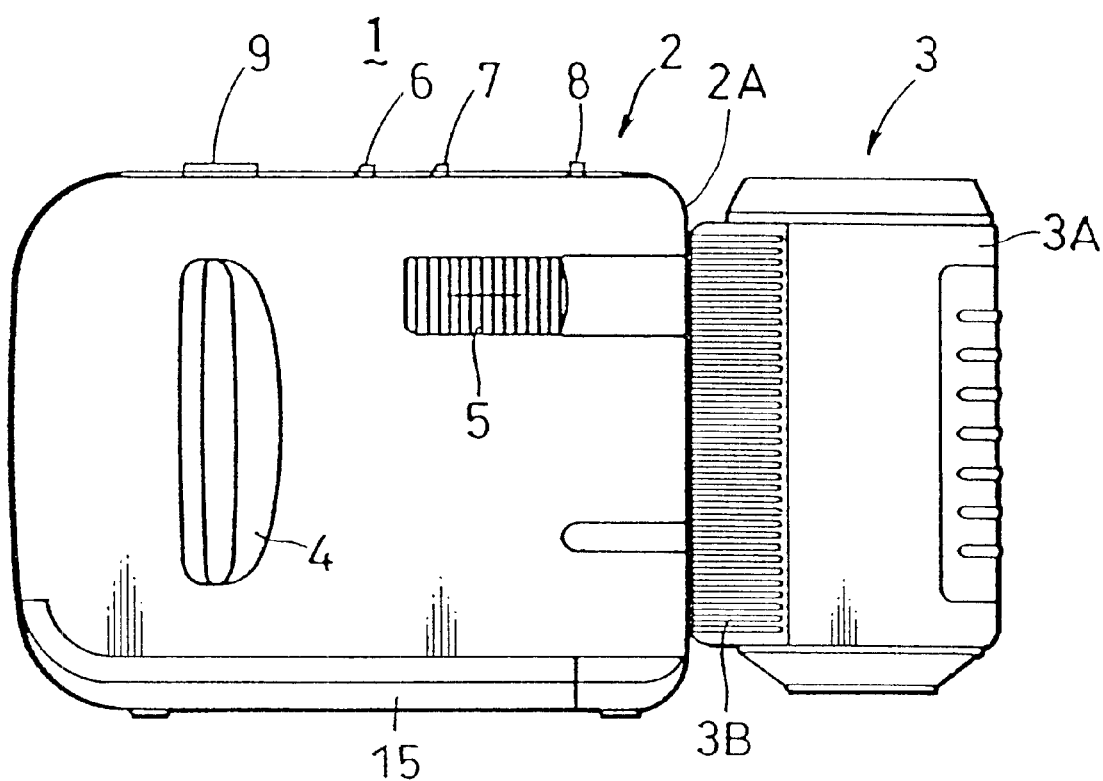
FIG. 1 is a front view of a digital camera which is an embodiment of an image pickup apparatus in accordance with this invention.

A grip 4 for holding the camera 1 is provided at a position on a front face and near to a left side wall of the camera body 2 (see FIG. 1). A flash unit 5 is provided at a position near to a upper-right end of the camera body 2. The monitor display 10 is provided substantially at the center of a rear face of the camera body 2 (see FIG. 2). The monitor display 10 displays not only a monitor image for serving as a viewfinder but also a still picture image recorded in the memory card 17. A flash mode selecting switch 11 with respect to a flash lighting is disposed above the monitor display 10. The camera 1 has "automatic flash lighting mode" for automatically lighting the flash unit 5 responding to a luminance of the object, "forcibly flash lighting mode" for forcibly lighting the flash unit 5 with no relation to the luminance of the object and "no flash lighting mode" for restricting the lighting of the flash unit 5. One of these three modes is cyclically selected by pushing the flash mode selecting switch 11 one by one.

A compression ratio switch 12 for selecting one of compression ratios of 1/8 and 1/20 is disposed below the monitor display 10. For example, when the compression ratio switch 12 is slid in right hand, the compression ratio of 1/8 is selected. Alternatively, when the compression ratio switch 12 is slid in left hand, the compression ratio of 1/20 is selected. Number of the compression ratios are not restricted by these two kinds. It is possible to design that one compression ratio be selected from a group of ratios more than three.

A recording/reproducing switch 14 for switching "recording mode" and "reproducing mode" of the camera 1 is provided at upper right portion of the rear face of the camera body 2. A main switch 16 for switching an electric power source is provided at left side of the recording/reproducing switch 14. In the recording mode, the camera 1 takes an image. In the reproducing mode, the camera 1 reproduces an image on the monitor display 10 by using the image data recorded in the memory card 17. The recording/reproducing switch 14 is a sliding switch having two contacts. When the recording/reproducing switch 14 is slid in right hand, the reproducing mode is selected. Alternatively, when the recording/reproducing switch 14 is slid in left hand, the recording mode is selected. The main switch 16 is a push switch. When the main switch 16 is pushed under ON state of the camera 1, the electric power source is turned off. Alternatively, when the main switch 16 is pushed under OFF state of the camera 1, the electric power source is turned on.

Figure 3:
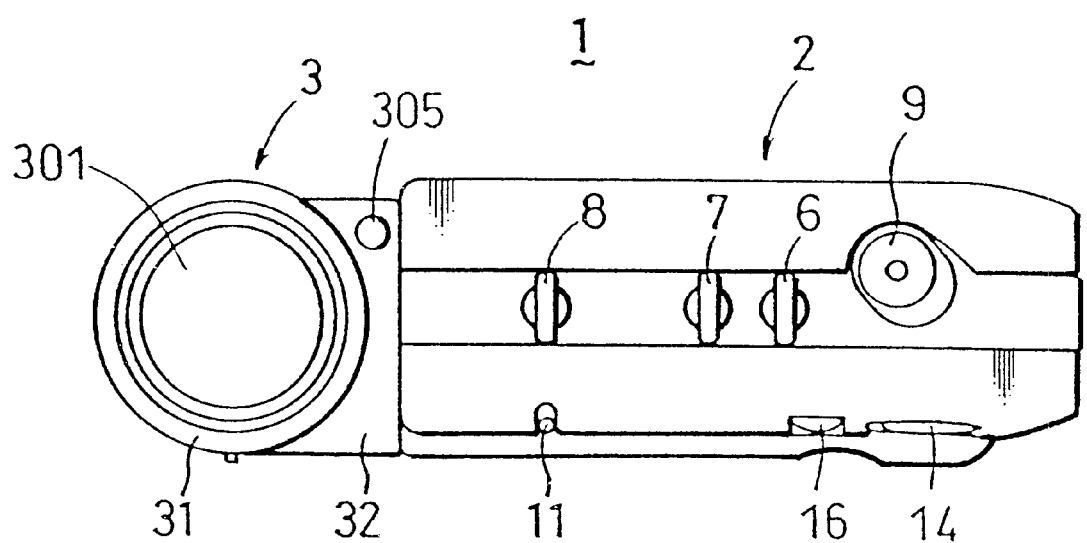
FIG. 3 is a top view of the digital camera.
Figure 4:
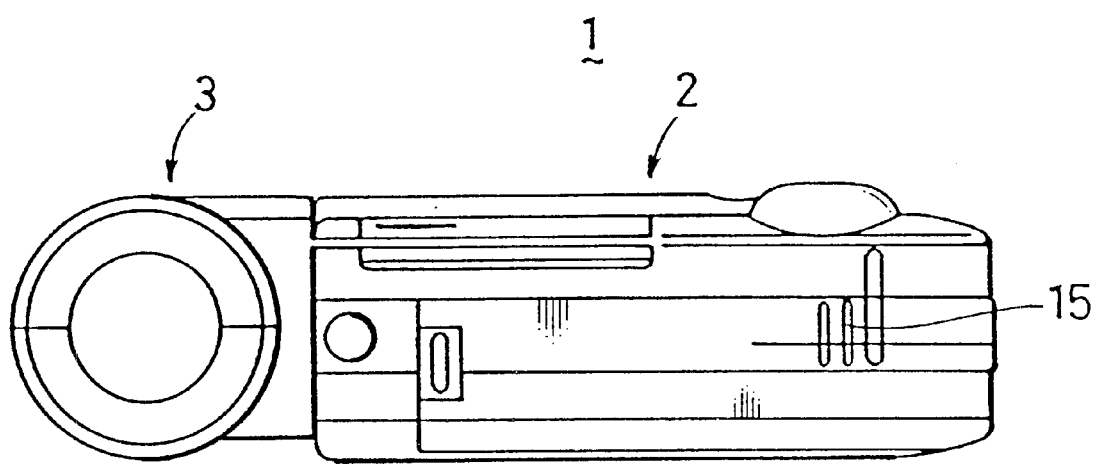
FIG. 4 is a bottom view of the digital camera.

As can be seen from FIG. 3, a frame up switch 6 and a frame down switch 7 for increasing and decreasing frame number in the reproducing mode is provided at center portion of a top face of the camera body 2. When the frame up switch 6 is pushed on, the frame number increases one by one. Alternatively, when the frame down switch 7 is pushed on, the frame number decreases one by one. When the frame number is decided, an image having the same frame number is reproduced. An erasing switch 8 for erasing image data stored in the memory card 17 is provided at left side of the frame down switch 7. A shutter release switch 9 is provided at upper right portion of the frame up switch 6.

As can be seen from FIG. 6, a clamshell type lid 15 is provided at a bottom face of the camera body 2 for covering a battery cavity and a memory card recorder.

Figure 5:
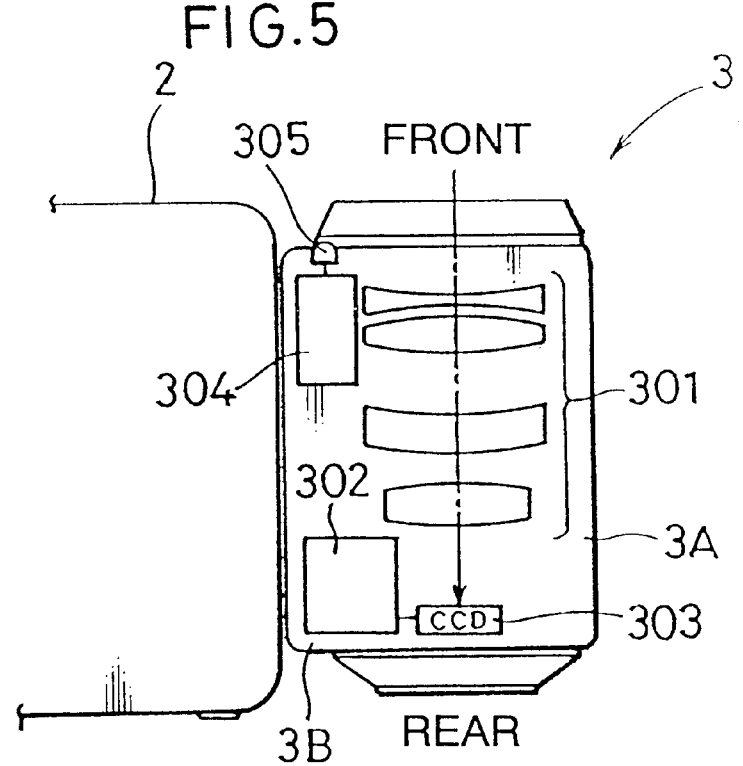
FIG. 5 is a sectional view showing a configuration of an image pickup unit of the digital camera.

As can be seen from FIG. 5, the image pickup unit 3 comprises a taking lens 301 such as a macro-zoom lens, an image pickup circuit 302, an image pickup device 303 such as a color area CCD, a light control circuit 304 and a photo-sensor 305. The taking lens 301 focuses an image of an object on a surface of the image pickup device 303. The image pickup device 303 photoelectrically transfers optical energy of an optical image to electric charge of each pixel thereof. The photo-sensor 305, which is provided in front of the housing 3A, senses a quantity of flash light reflected from the object. The light control circuit 304 controls a time of flashing of the flash unit 5 responding to the quantity of light sensed by the photo-sensor 305.

Figure 2:
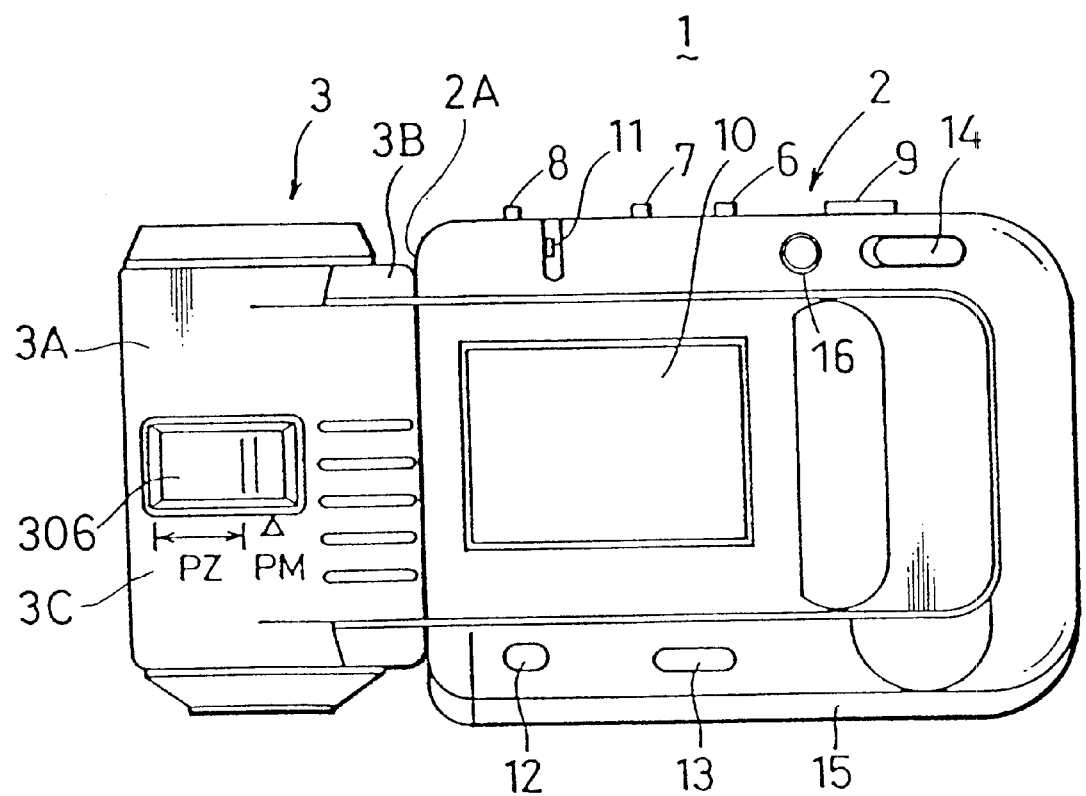
FIG. 2 is a rear view of the digital camera.

A zooming switch 306 for changing a focal length of the taking lens 301 or for switching the taking lens 301 between a normal image pickup mode and a macroscopic image pickup mode is provided on a surface 3C of the housing 3A of the image pickup unit 3 which is illustrated parallel to a back face of the camera body 2 in FIG. 2. When the camera 1 is normally used for taking an image of an object disposed in front of the camera 1, the image pickup unit 3 is rotated by 90 degrees from the standard position in a manner so that the optical axis of the taking lens 301 directs the object and the surface 3C positions at top end.

The zooming switch 306 can be slid in a direction perpendicular to the optical axis of the taking lens 301. While the zooming switch 306 is moved in a zooming region designated by symbol PZ in FIG. 2, the focal length of the taking lens 301 is changed. When the zooming switch 306 is moved over the zooming region PZ and it reaches to a macro position designated by symbol PM, the taking lens 301 is changed to the macroscopic image pickup mode. In the macroscopic image pickup mode, an object distant from about 50 cm from the front face of the taking lens 301 can be focused.

A block diagram of a control system of the digital camera 1 is shown in FIG. 7. Elements designated by the same numerals in FIGS. 1 to 6 are substantially the same.

An aperture mechanism which is not shown in the figure is provided in an optical lens system of the taking lens 301 in the image pickup unit 3. A signal processing circuit 307 and a timing generator (T·G) 308 are included in the image pickup circuit 302 shown in FIG. 5. The image pickup device (CCD) 303 outputs image signals of R(red), G(green) and B(blue) components with respect to each pixel which are serially arranged as an array of image signals. The image signals from the image pickup device 303 correspond to electric charges stored on each pixel. The timing generator 308 generates several kinds of control signals by using a standard clock and timing control signals transmitted from a timing controller 204 in the camera body 2 for controlling the image pickup device 303. The control signals include timing signals for starting and stopping the charge storage of the image pickup device 303, a horizontal synchronizing signal, a vertical synchronizing signal and a transfer signal for controlling reading out of the charge in the pixels.

With respect to the exposure control of an image for the viewfinder display in the image pickup unit 3, the aperture mechanism is immovably fixed for having a predetermined aperture size, and the charge storage time of the image pickup device 303 corresponding to the exposure control time t' is controlled for exposing the image pickup device 303 under a proper light quantity. Alternatively, for taking an image for a still picture image which is to be recorded in the memory card 17, both of the size of the aperture and the charge storage time of the image pickup apparatus 303 are controlled.

In the exposure control of the image pickup device 303, a scanning time $tr_0$ for one horizontal line in a video image is used as a standard time unit. Hereupon, $tr_0=1/(30\times512) \approx 65$ µs. A control circuit of the camera 1 calculates an exposure control time t' by integral multiply of the standard time unit $tr_0$. In the control circuit of the camera 1, an exposure value EV is calculated by corresponding a luminance of an object, and the exposure control time t' is selected corresponding to the exposure value EV. A data of the exposure control time t' is entered into the timing generator 308. The exposure control time t' corresponds to a first exposure time of the invention.

The signal processing circuit 307 analogously processes predetermined processing to the image signals outputted from the image pickup device 303. The signal processing circuit 307 comprises a correlation dual sampling (CDS) circuit 307a and an automatic gain control (AGC) circuit 307b. The CDS circuit 307a reduces noise component from the image signals. The AGC circuit 307b adjusts levels of the image signals by adjusting the gain.

The level adjustment in the AGC circuit 307b amplifies the image signals by using previously set gain $Gr_0$ in a manner so that the image signals are smoothly processed in the circuits 201 to 214 in the camera body 2. However, when the luminance of the object is too low to set a proper exposure control time t", the AGC circuit 307b amplifies the image signals by a gain ($Gr_0+\Delta G$) for compensating insufficient exposure light quantity.

When the aperture mechanism is immovably fixed and the exposure is controlled by varying only the exposure time, a proper exposure control time t" is obtained by integral multiply of a time unit tr so that the proper exposure control time t" is variable by multi steps. The time unit tr is shorter than the standard time unit $tr_0$. The proper exposure control time t" corresponds to a second exposure time of the invention.

For displaying an image on the monitor display 10 serving as the viewfinder, a proper exposure time value TVp which is a converted time value of the proper exposure control time t" by APEX is calculated by using an exposure control value EVc corresponding to the luminance of the object and an aperture value AV corresponding to the aperture size or area of the aperture mechanism (TVp=EVc−AV). When there is a difference time value $\Delta TVa$ between the proper exposure time value TVp and an exposure control time value TVc which is a converted time value of the exposure control time t', the difference time value $\Delta TVa$ is compared with an exposure control step $\Delta EV$. When the difference time value $\Delta TVa$ is larger than the exposure control step $\Delta EV$, the insufficient exposure due to the difference time value $\Delta TVa$ cannot be ignored in consider with an accuracy of the exposure control. Thus, the AGC circuit 307b amplifies the image signals by using the gain ($Gr_0+\Delta TV_G$) for compensating the insufficient exposure light quantity.

The exposure control in the viewfinder display is described. Table 2 shows a relation between the exposure control time value TVc and the compensation gain $\Delta TV_G$ of the gain G under a condition that the exposure control time value TVc can be varied by 1/8 step and the aperture value (aperture size of the aperture mechanism) is fixed.

When a proper exposure value which is calculated by corresponding to the luminance of the object is designated by symbol EVp, the proper exposure time value TVp is calculated by the equation of TVp=EVp−4.0, since the aperture value AV is fixed at value 4.0. The proper exposure value EVp is variable by 1/8 step, so that the proper exposure time value TVp is also set by 1/8 step. However, the exposure control time t' for controlling the charge storage time of the image pickup device 303 is only selectable from values of integral multiply of the standard time unit $tr_0$ which is equal to 65 μs. Thus, it is possible that the difference time value ΔTVa (=TVc−TVp) is larger than 1/8 step in a region of relatively short exposure time.

TABLE 2

| EVp | TVp | Integer | TVc | ΔTVa | Gain |
|---|---|---|---|---|---|
| . | . | . | . | . | . |
| . | . | . | . | . | . |
| . | . | . | . | . | . |
| 17.250 | 13.250 | 1 | 13.907 | 0.657 | $Gr_0$ + 0.657 |
| 17.125 | 13.125 | 1 | 13.907 | 0.782 | $Gr_0$ + 0.782 |
| 17.000 | 13.000 | 1 | 13.907 | 0.907 | $Gr_0$ + 0.9.7 |
| . | . | . | . | . | . |
| . | . | . | . | . | . |
| . | . | . | . | . | . |
| 16.000 | 12.000 | 3 | 12.322 | 0.322 | $Gr_0$ + 0.322 |
| 15.875 | 11.875 | 4 | 11.907 | 0.032 | $Gr_0$ |
| 15.750 | 11.750 | 4 | 11.907 | 0.157 | $Gr_0$ + 0.157 |
| 15.625 | 11.625 | 4 | 11.907 | 0.282 | $Gr_0$ + 0.282 |
| 15.500 | 11.500 | 5 | 11.585 | 0.085 | $Gr_0$ |
| 15.375 | 11.375 | 5 | 11.585 | 0.210 | $Gr_0$ + 0.210 |
| 15.250 | 11.250 | 6 | 11.322 | 0.072 | $Gr_0$ |
| 15.125 | 11.125 | 6 | 11.322 | 0.197 | $Gr_0$ + 0.197 |
| 15.000 | 11.000 | 7 | 11.100 | 0.100 | $Gr_0$ |
| . | . | . | . | . | . |
| . | . | . | . | . | . |
| . | . | . | . | . | . |
| 11.500 | 7.500 | 84 | 7.515 | 0.015 | $Gr_0$ |
| 11.375 | 7.375 | 92 | 7.383 | 0.008 | $Gr_0$ |
| 11.250 | 7.250 | 100 | 7.263 | 0.013 | $Gr_0$ |
| 11.125 | 7.125 | 110 | 7.126 | 0.001 | $Gr_0$ |
| 11.000 | 7.000 | 120 | 7.000 | 0.000 | $Gr_0$ |
| . | . | . | . | . | . |
| . | . | . | . | . | . |
| . | . | . | . | . | . |

As can be seen from table 2, when the proper exposure value EVp=15.750, the proper exposure time value TVp becomes 11.750. On the other hand, the exposure control time value TVc is 11.907, so that the difference time value ΔTVa=11.907−11.750=0.157 becomes larger than the exposure control step ΔEV=0.125. If the value 12.322 or 11.585 of the exposure control time value TVc which is larger or smaller by one step from the value 11.907 is selected, the difference time value ΔTVa becomes much larger than 0.157. Thus, the exposure cannot be controlled with an error component less than 0.125 EV by the variable exposure control time value TVc.

Furthermore, even when the proper exposure value EVp is 15.875 or 15.625, the exposure control time value TVc becomes 11.907. In a region of the proper exposure value EVp=15.625 to 15.875, the image is taken by the same exposure time. If the image is reproduced on the monitor display 10, the density of the image becomes the same.

The camera 1 of the embodiment compensates the level of the image signals so that the density of the image displayed on the monitor display 10 becomes proper. In the above-mentioned example, when the difference time value ΔTVa between the proper exposure time value TVp and the exposure control time value TVc for controlling the image pickup device 303 is larger than the exposure control step ΔEV, the AGC circuit 307b adds the compensation gain $ΔTV_G$ corresponding to the difference time value ΔTVa to the predetermined gain $Gr_0$ and the image signals are amplified by the gain $Gr_0+ΔTV_G$ for compensating the insufficient exposure light quantity. In the AGC circuit 307b, an amplification factor $G_1$ corresponding to the compensation gain $ΔTV_G$ is actually multiplied on an amplification factor $G_0$ corresponding to the gain $Gr_0$.

In this embodiment, a value of the exposure control time value TVc which is the nearest to but equal to or smaller than the proper exposure time value TVp is selected, and the AGC circuit 307b compensates the insufficient exposure light quantity by amplification of the image signals. However, it is possible that a value of the exposure control time value TVc is selected from a region not only smaller than but also large than the proper exposure time value TVp. The AGC circuit 307b compensates the surpassed exposure light quantity by reducing the amplitude of the image signals in the latter case. For example, when the proper exposure time value TVp is 11.750 and the exposure control time value TVc is selected to be 12.322 in the above-mentioned example, the AGC circuit 307b subtracts a gain corresponding to the difference time value ΔTVa=12.322−11.750= 0.572 from the predetermined gain $Gr_0$.

Furthermore, the gain $Gr_0$ is compensated by the compensation gain $ΔTV_G$ corresponding to the difference time value ΔTVa by the AGC circuit 307b when the difference time value ΔTVa is larger than the exposure control step ΔEV=⅛ in the embodiment. However, it is possible that the gain $Gr_0$ is always compensated by adding or subtracting the compensation gain $ΔTV_G$. Alternatively, it is possible that the gain $Gr_0$ is compensated by adding or subtracting the compensation gain $ΔTV_G$ when the difference time value ΔTVa is larger than a predetermined threshold value such as 0.1.

Other elements in the image pickup unit 3 shown in FIG. 7 are described. The light control circuit 304 controls a light quantity of the flash unit 5 in the flash lighting exposure to a predetermined quantity set by a main control circuit 201 in the camera body 2. In the flash lighting exposure, the photo-sensor 305 starts to receive a reflected light of the flash light from the object responding to the start of the exposure. When the light quantity received by the photo-sensor 305 reaches to a predetermined quantity, a lighting stop signal STP is outputted from the light control circuit 304 to a flash lighting (FL) control circuit 202. The FL control circuit 202 forcibly stops the lighting of the flash unit 5 corresponding to the lighting stop signal STP. Thereby, the quantity of the flash light by the flash unit 5 is controlled to be the predetermined quantity. Switches 309 detect, for example, a position of the zooming switch 306, a direction of the image pickup unit 3, and so on.

Circuits in the camera body 2 are described. The FL control circuit 202 further controls the lighting and no-lighting of the flash unit 5, the quantity of the flash lighting and the start timing of the flash light. A standard clock generator 203 generates a standard clock. A timing controller 204 generates a clock CLK1 for the timing generator 308 and a clock CLK2 for an A/D converter 205. The standard clock generator 203 and the timing controller 204 are controlled by the main control circuit 201.

The A/D converter 205 converts the analogous image signals from the image pickup unit 3 to ten-bits digital signals by using the clock CLK2 outputted from the timing controller 204. The image signals correspond to electric charges stored on the pixels of the image pickup device 303.

Figure 8:
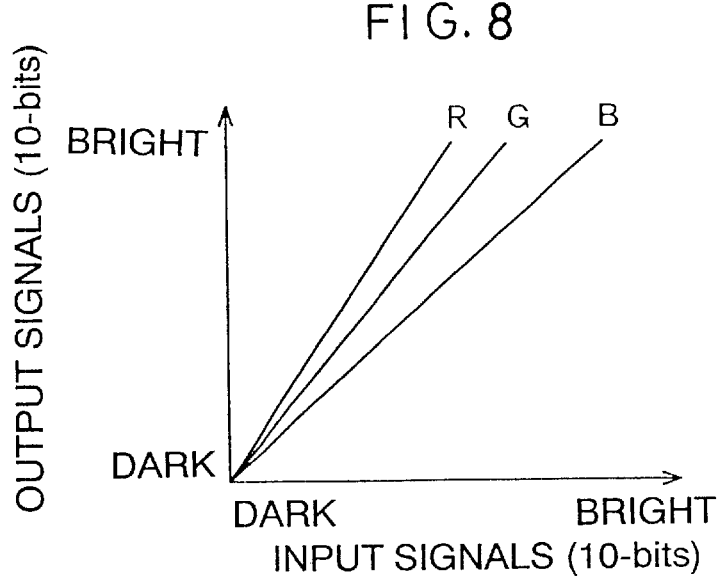
FIG. 8 is a graph showing characteristic curves of a level transforming table.

A black level compensating (BLC) circuit 206 compensates a black level of the A/D converted signals with respect to the pixels (hereinafter called pixel data) to a standard black level. A white balance (WB) circuit 207 adjusts the white balance of the image by adjusting the levels of the pixel data with respect to each colors of R, G and B. The levels of the pixel data are converted by using a level adjusting table corresponding to, for example, characteristic curves shown in FIG. 8. The main control circuit 201 forms a level adjusting table for each image.

A γ compensating circuit 208 compensates γ characteristic of the pixel data by using a γ compensating table. The γ compensating circuit 208 has, for example, two kinds of γ compensating tables respectively corresponding to the γ characteristic curves shown in FIG. 9. In the γ compensating process, the ten-bits data of the pixel data before the γ compensation is converted to eight-bits (256 tones) data of the pixel data. The reason why the pixel data before the γ compensation is formed ten-bits data is to prevent the inferior of the quality of the image when the γ compensation is executed by using a heavily non-linear γ characteristics. The level of each component of R, G and B of the pixel data is previously adjusted by the WB circuit 207, so that the γ compensating circuit 208 compensates γ characteristic of each component of R, G and B of the pixel data by using a γ compensating table.

Figure 9:
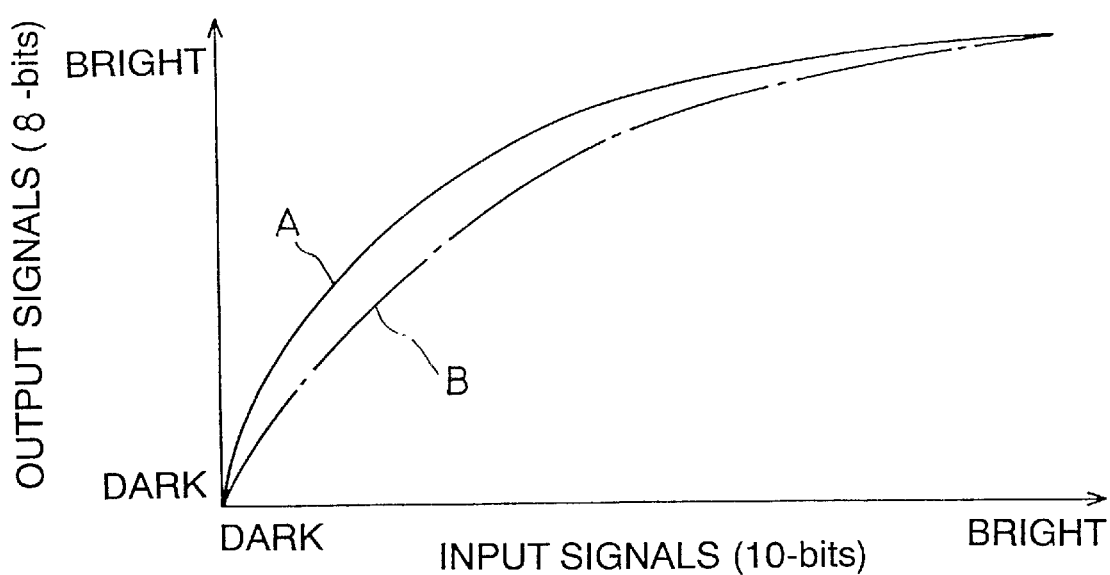
FIG. 9 is a graph showing γ-characteristic curves of a γ compensating table.

In FIG. 9, a first characteristic curve "A" illustrated by a solid line shows a relation between the input signal (ten-bits data) and the output signal (eight-bits data) when γ equal 0.45, which is used in the image data processing for displaying the image on the monitor display 10 serving as the viewfinder. The monitor display 10 has a characteristic of γ=2.2. When the camera 1 waits the shutter release operation, an image of an object is taken by the image pickup device 303 at an interval of 1/30 sec. The image taken by the image pickup device 303 is renewed and displayed on the monitor display 10. When the shutter release switch 9 is not operated, the γ compensating circuit 208 compensates γ characteristic of the pixel data by using the γ compensating table corresponding to the characteristic curve "A" for improving the quality of the image displayed on the monitor display 10.

A second characteristic curve "B" illustrated by a one-dotted chain line shows a relation between the input signal and the output signal when γ equal 0.55, which is used in the image data processing for recording the image of a normal scene in the memory card 17. The camera 1 can externally be connected to a personal computer 18. The image data recorded in the memory card 17 is normally introduced in the personal computer 18 and displayed on a monitor display of the personal computer 18. The monitor display of the personal computer 18 generally has a characteristic of γ=1.8. Thus, when the shutter release switch 9 is operated, the γ compensating circuit 208 compensates γ characteristic of the pixel data by using the γ compensating table corresponding to the characteristic curve "B" for improving the quality of the image recorded in the memory card 17 and displayed on the monitor display of the personal computer 18.

Figure 10:
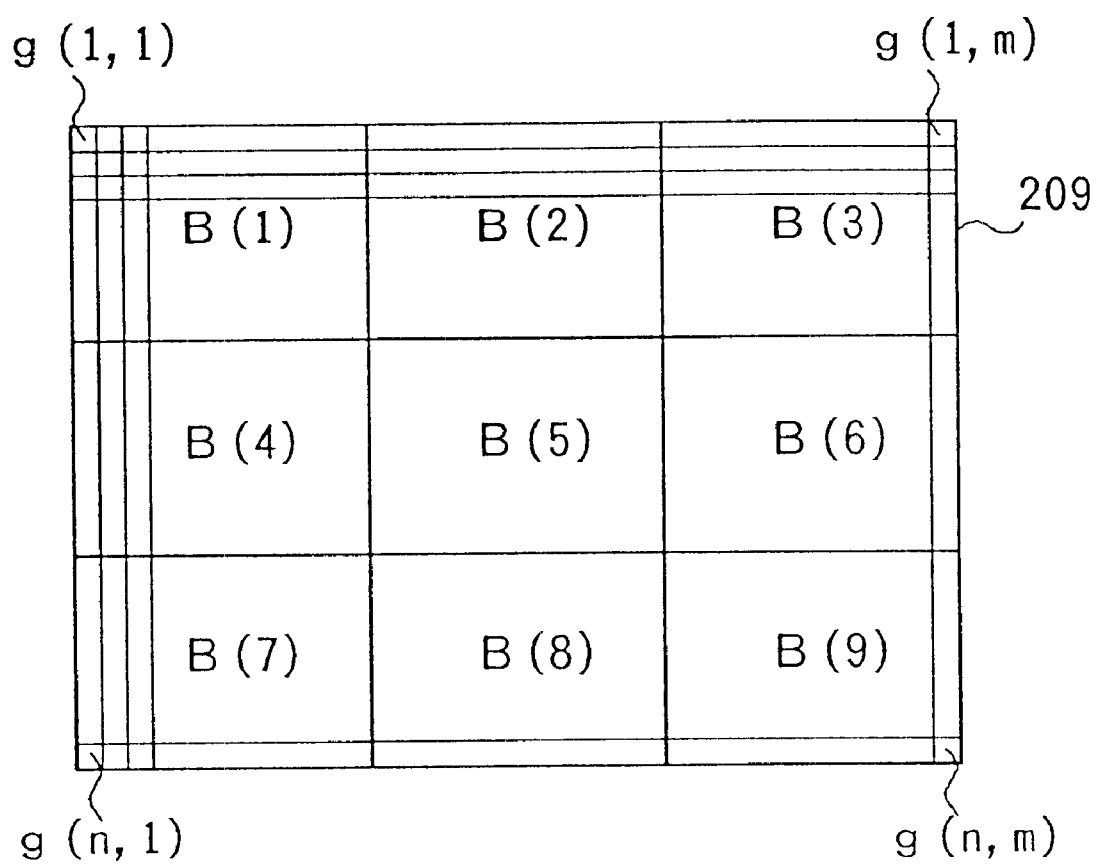
FIG. 10 is a schematic view showing memorized positions of data of pixels in a image data memory.

An image memory 209 temporarily memorizes the pixel data outputted from the γ compensating circuit 208. The image memory 209 has a capacity sufficient for memorizing the image data corresponding to one frame of the image. When the image pickup device 303 has m×n number of the pixels, the image memory 209 has the capacity for m×n number of the pixels and memorizes each pixel data g(i, j) (i=1, 2, . . . n, j=1,2, . . . m) as shown in FIG. 10 at corresponding position (i, j).

A VRAM 210 serves as a buffer memory of the pixel data displayed on the monitor display 10. The VRAM 210 has a capacity corresponding to the number of pixels of the monitor display 10.

In the waiting mode, the pixel data taken by the image pickup unit 3 at the interval of 1/30 sec are processed by the A/D converter 205 to the γ compensation circuit 208, memorized in the image memory 209, transmitted to the VRAM 210 through the main control circuit 201 and displayed on the monitor display 10. Thus, the user can be observed the image of the object displayed on the monitor display 10. In the reproducing mode, the image data is read out from the memory card 17, processed by the main control circuit 201, transmitted to the VRAM 210 and displayed on the monitor display 10.

Switches 211 corresponds to the frame up switch 6, the frame down switch 7, the erasing switch 8, the flash mode selecting switch 11, the compression ratio switch 12 and the recording/reproducing switch 14. An RTC 212 is a clock circuit for administrating the date of image pickup. The RTC 212 is driven by an independent battery from the main battery E. A card interface (card I/F) 213 is an interface for writing/reading the image data into/from the memory card 17. A communication I/F 214 is an interface such as an USB (Universal Serial Bus) connector by which the personal computer 18 is connected.

The main control circuit 201 comprises a microcomputer for controlling the total operation of the camera 1 including the control every elements of the camera body 2 and the image pickup unit 3. The main control circuit 201 further comprises a luminance sensing portion 201a for sensing a level of a luminance of an object and an exposure time setting portion 201b for setting an exposure time based on the luminance of the object.

The luminance sensing portion 201a senses the luminance of the object by using the image taken by the image pickup device 303 at the interval of 1/30 sec in the waiting mode. As shown in FIG. 10, the luminance sensing portion 201a divides more area of the image memory 209 into nine blocks B(1), B(2), . . . B(9). Furthermore, the luminance sensing portion 201a calculates nine luminance data BV(r) (r=1 to 9) with respect to each block B(r) by using a mean value of pixel data $g_G$(k, h) of the green component included in each block B(r). Finally, the luminance of the object is decided by using nine luminance data BV(r).

Alternatively, it is possible to calculate the luminance data BV(r) of each block B(r) by using the pixel data $g_R$(k, h), $g_G$(k, h) and $g_B$(k, h) of the red, green and blue components. In this case, the pixel data $g_R$(k, h), $g_G$(k, h) and $g_B$(k, h) of the red, green and blue components at each position (k, h) of the pixel are added by a predetermined ratio (for example, $g_R$:$g_G$:$g_B$=4:5:1) for calculating a luminance data BV(k, h) (=0.4$g_R$+0.5$g_G$+0.1$g_B$) at the position. Finally, the luminance data BV(r) of each block B(r) is obtained by calculating a mean value of the luminance data BV(k, h) included in the block B(r).

The exposure time setting portion 201b sets the exposure control time value TVc and the compensation gain $\Delta TV_G$ of the AGC circuit 307b corresponding to the difference time value $\Delta TVa$, if necessary. The exposure time setting portion 201b has a table including the exposure control time value TVc and the compensation gain $\Delta TV_G$ corresponding to the difference time value $\Delta TVa$ with respect to each exposure value EV. The exposure time setting portion 201b sets the exposure control time value TVc and the compensation gain $\Delta TV_G$ by using the table corresponding to the luminance sensed by the luminance sensing portion 201a.

When the main switch 16 is turned on and the camera 1 is started up, the exposure time setting portion 201b sets a predetermined initial value, for example, TV=7.0, and outputs the signal corresponding to the initial value as the exposure control time value TVc to the timing generator 308. The luminance setting portion 201a judges the luminance of the object by using an image taken by the exposure control time value TVc. When the luminance of the object is judged higher than a proper value, the exposure time setting portion 201b shortens the exposure control time value TVc by 1/8 step (TV=0.125). Alternatively, when the luminance of the object is judged lower than a proper value, the exposure time setting portion 201b lengthens the exposure control time value TVc by 1/8 step (TV=0.125). Furthermore, the exposure time setting portion 201b calculates the exposure control time value TVc and the compensation gain $\Delta TV_G$ by using the changed exposure time value TV. When the proper exposure time value TVp is equal to or smaller than 10.5, the difference time value $\Delta TV$ between the changed exposure time value TV and the exposure control time value TVc never be larger than 1/8 step (TV=0.125), so that only the exposure time of the image pickup device 303 is varied.

After changing the exposure time value TV, the exposure time setting portion 201b judges the luminance of the object and changes the exposure time value TV with respect to the next image. The exposure time setting portion 201b alternatively repeats the judgement of the luminance of the object and the change of the exposure time value TV so as to set the actually proper exposure time value TVp after passing a predetermined time. When the proper exposure time value TVp is larger than 10.5, the difference time value $\Delta TVa$ is possible to over 1/8 (TV=0.125). At this time, the compensation gain $\Delta TV_G$ corresponding to the difference time value $\Delta TVa$ is set for compensating the gain.

The main control circuit 201 shown in FIG. 7 further comprises a filtering portion 201c for filtering the image data, a recording data forming portion 201d for recording the image data in the memory card 17 and a reproducing image data forming portion 201e for reproducing the image data recorded in the memory card 17 on the monitor display 10.

The filtering portion 201c compensates high frequency component of the image by digital filtering process for increasing the quality with respect to the silhouette. The recording data forming portion 201d processes two-dimensional DCT conversion and data compression by JPEG (Joint Photographic Coding Experts Group) such as Huffman cording for forming an image data compressed by the compression ratio K such as 1/8 or 1/20 which was set by the compression ratio switch 12.

The reproducing image data forming portion 201e reads an image data from the memory card 17 and forms a compensated image data which can be reproduced on the monitor display 10. The image data recorded in the memory card 17 is compensated by a γ coefficient (γ=0.55) for the monitor display of the personal computer 18. If the image data recorded in the memory card 17 is directly reproduced on the monitor display 10, the quality of the image displayed on the monitor display 10 becomes a high-contrast one because of the discordance of the γ coefficient (γ=0.55) for the monitor display of the personal computer 18 and the γ coefficient (γ=0.45) for the monitor display 10. Thus, the reproducing image data forming portion 201e re-compensates the γ characteristic of the image when the image data to be displayed on the monitor display 10.

In the recording mode, when the image pickup is indicated by pushing the shutter release switch 9, the main control circuit 201 processes a contour compensation by the filtering portion 201c, generates a compressed image data to be recorded in the memory card 17 by the recording data forming portion 201d, and records the image data with index information such as a frame number, exposure value, exposure time, compression ratio K, and so on.

In the reproducing mode, when a frame number of the image data is indicated, the main control circuit 201 reads a compressed image data having the same frame number from the memory card 17, forms an image data for the display by expanding the compressed image data by the reproducing image data forming portion 201e, compensates the γ characteristic of the expanded image data by using the characteristic of γ=0.82, and transmits the compensated image data to the VRAM 210 for reproducing the image on the monitor display 10.

Figure 11:
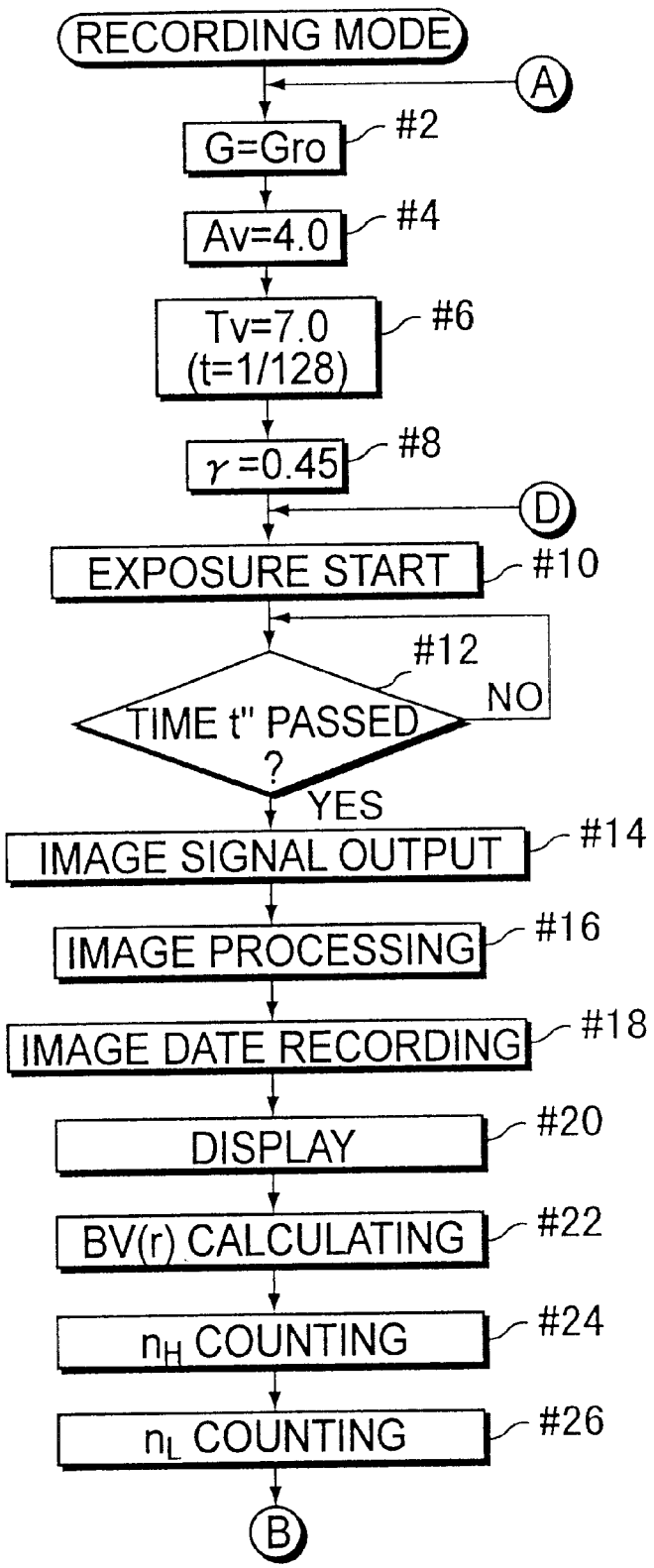
FIG. 11 is a flowchart for controlling an image pickup motion in a recording mode.
Figure 12:
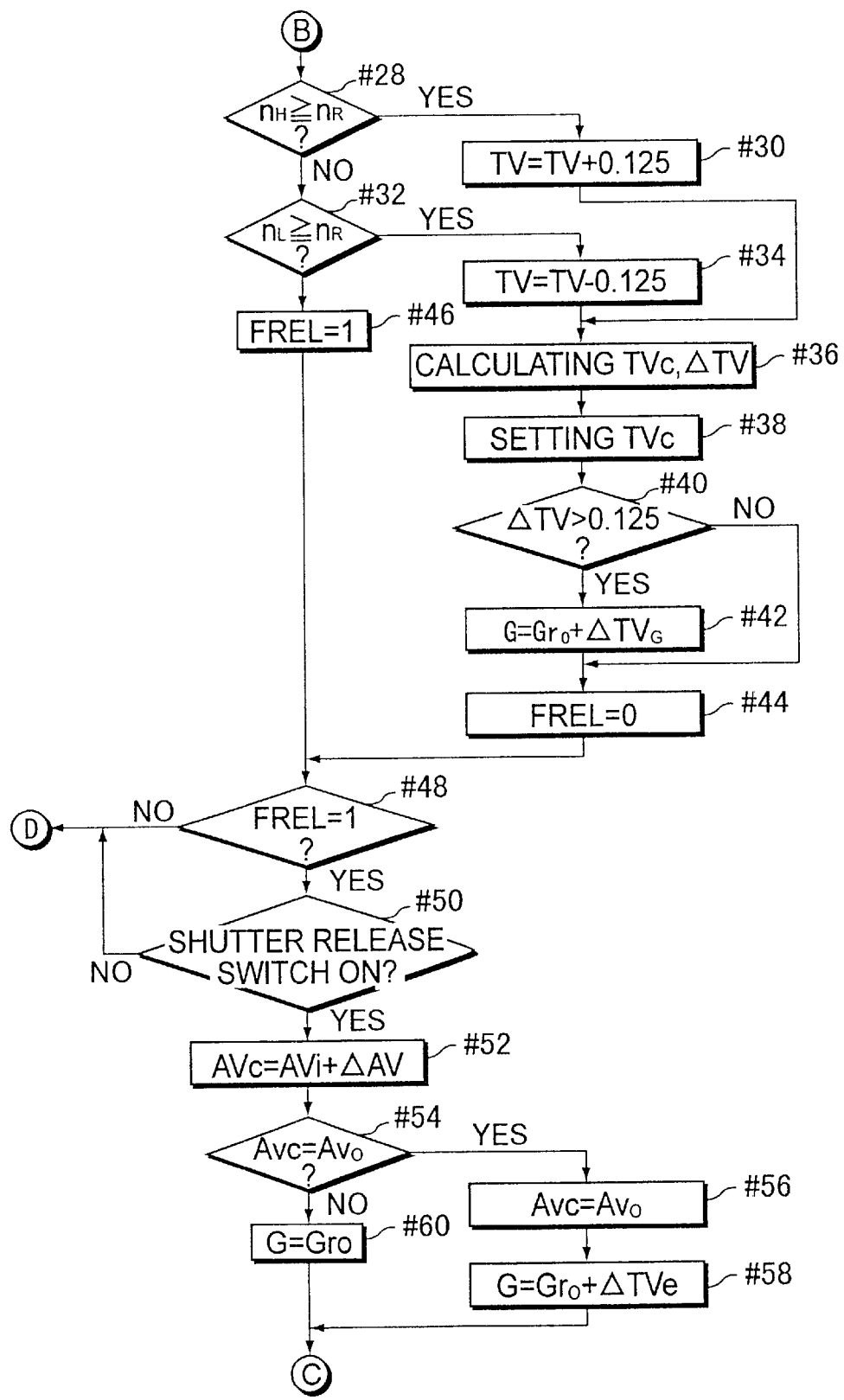
FIG. 12 is a continuation of the flowchart shown in FIG. 11.
Figure 13:
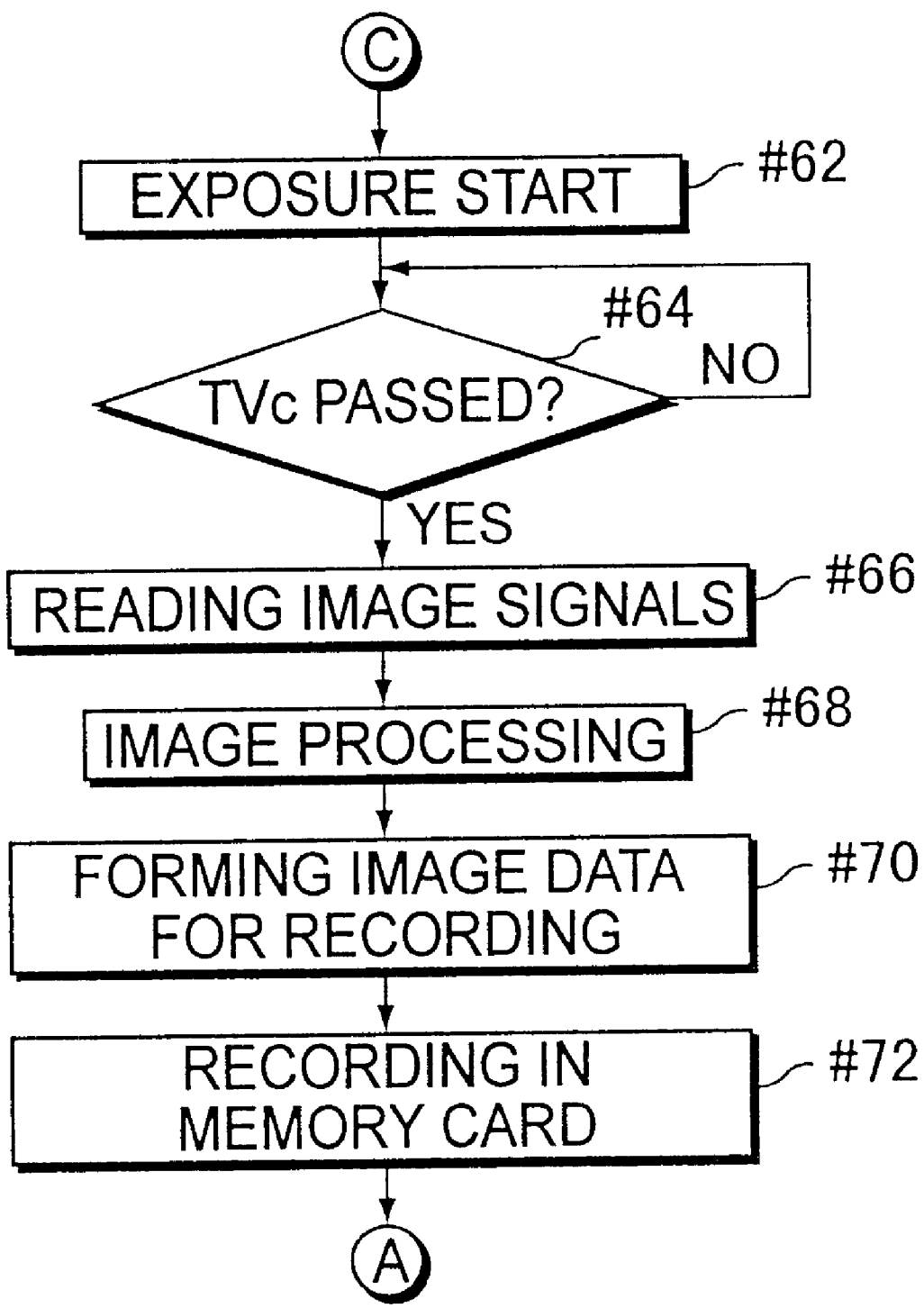
FIG. 13 is a continuation of the flowchart shown in FIGS. 11 and 12.

An image pickup operation control in the recording mode of the camera 1 is described with reference to a flowchart shown in FIGS. 11 to 13. The image pickup operation control is mainly configured by the viewfinder process, the exposure control and the image data process. The viewfinder process displays an image of an object on the image pickup device 10 to be observed by the user. In the viewfinder process, the proper exposure time value TVp is set.

At first, an initial value $Gr_0$ is set as a gain G for the AGC circuit 307b (step #2). A size of the aperture mechanism is set to be a predetermined value corresponding to, for example, AV=4.0 (step #4). A predetermined initial value TV=7.0 (1/128 sec) is set as the exposure control time value TVc (step #6). After setting a characteristic of γ=0.45 (the second characteristic curve "B" in FIG. 9) (step #8), the image pickup device 303 is started to be exposed (step #10). When the predetermined exposure control time t" (t"=1/128 sec) has passed (YES in step #12), image signals taken by the image pickup device 303 is outputted (step #14). After the image signals are processed by the signal processing circuit 307, the AND converter 205, the BLC circuit 206, the WB circuit 207 and the γ compensation circuit 208 (step #16), they are memorized in the image memory 209 (step #18). The image data memorized in the image memory 209 are directly read by the VRAM 210, and displayed on the monitor display 10 as the viewfinder (step #20).

Furthermore, the image is divided into nine blocks B(1) to B(9) as shown in FIG. 10, and the luminance data BV(r) (r=1 to 9) for showing the luminance of each block B(r) are calculated (step #22). The luminance data BV(r) are obtained by calculating a mean value of the pixel data $g_G$(k, h) of the green component included in each block B(r) and read out from the image memory 209.

Subsequently, the luminance data BV(r) are compared with a predetermined high-level threshold value $BV_H$ (for example, 200 in 256 tones), and a number $n_H$, of the blocks having the luminance data BV(r) equal to or larger than the threshold value $BV_H$ is counted (step #24). Similarly, the luminance data BV(r) are compared with a predetermined low-level threshold value $BV_L$ (for example, 50 in 256 tones), and a number of the blocks $n_L$ having the luminance data BV(r) smaller than the threshold value $BV_L$ is counted (step #26).

The numbers $n_H$ and $n_L$ of the blocks are compared with a predetermined number $n_R$ of the blocks and judged whether they are equal to or larger than the number $n_R$ such as six (steps #28 and #32). When $n_H \geq n_R$ (YES in step #28), the luminance is wholly higher in the image (over exposure). Thus, the value of the exposure time value TV is changed to a new value larger by one step of the exposure control step $\Delta EV(=0.125)$ than the present value (step #30). Alternatively, when $n_L > n_R$ (YES in step #32), the luminance is wholly lower in the image (under exposure). Thus, the value of the exposure time value TV is changed to a new value smaller by one step of the exposure control step $\Delta EV$ than the present value (step #34). Since the exposure time value TV for the first exposure is set to the initial value 7.0, when $n_H > n_R$, the exposure time value TV is changed to 7.125. Alternatively, when $n_L>n_R$, the exposure time value TV is changed to 6.875.

Subsequently, the exposure control time TVc is calculated by using the changed exposure time value TV, and the difference time value ΔTV between the changed exposure time value TV and the exposure control time value TVc (step #36). The exposure control time t' corresponding to the exposure control time value TVc is set to the timing generator (step #38).

The difference time value ΔTV is compared with the exposure control step ΔEV(=0.125) and judged whether the difference time value ΔTV is larger than the exposure control step ΔEV or not (step #40). When ΔTV>ΔEV (YES in step #40), the compensation gain $\Delta TV_G$ is added to the initial value of the gain $Gr_0$ (step #42). Furthermore, after resetting the flag FREL to "0", the main control circuit 201 jumps to step #48. Alternatively, whenΔTV≦ΔEV (NO in step #40), step #42 is skipped and the flag FREL is reset to "0". Furthermore, the setting of the flag FREL is judged in step #48.

On the other hand, when $n_H<n_R$ or $n_L<n_R$ (NO in step #28 or #32), the exposure time value which was previously set is really proper, so that the flag FREL is set to "1" (step #46). Furthermore, the setting of the flag FREL is judged in step #48.

When the flag FREL is reset to "0" (NO in step #48), the main control circuit 201 returns to step #10 for changing the exposure time value TV. Alternatively, when the flag FREL is set to "1" (YES in step #48), the exposure time value TV is proper, that is the actually proper exposure time value TVp is set. Thus, the main control circuit 201 judges whether the shutter release switch 9 is turned on or not (step #50). When the shutter release switch 9 is not turned on (NO in step #50), the main control circuit 201 returns to step #10 and repeats the steps #6 to #28, #32 and #46 to #50 until the shutter release switch 9 is turned on.

The flag FREL shows the possibility of the shutter release operation. When the flag FREL is set to "1", it shows the shutter is releasable. Alternatively, when the flag FREL is reset to "0", is shows the shutter is unreleasable. In case of changing the exposure time value TV, the previously set exposure time value TV is improper (the exposure value EV is improper). Thus, the flag FREL is reset to "0" for restricting the shutter release.

Since the image pickup device 303 takes the image for the viewfinder at the interval of 1/30 sec. the main control circuit 201 processes the above-mentioned steps #6 to #50 with respect to each image. If the initially set exposure time value TV is improper, the exposure time value TV is increased or decreased one exposure control step by one from the initial value for setting the really proper exposure time value TVp with the viewfinder process.

When the exposure time value TV is changed to a value much larger than the initial value by the processes of step #6 to #50 and the difference time value ΔTV between the changed exposure time value TV and the exposure control time value TVc overpasses the exposure control step ΔEV, the compensation gain $\Delta TV_G$ corresponding to the difference time value ΔTV is added to the gain $Gr_0$ for compensating the exposure control value by amplification of the image signals (step #42). Thereby, the density of the image displayed on the monitor display 10 serving as the viewfinder can be made substantially proper, even though the difference time value Δ TVa between the proper exposure time value TVp corresponds to the luminance of the object and the exposure control time value TVc essentially restricted by the mechanism of the image pickup device 303 is larger than the exposure control step ΔEV (=0.125).

When the shutter release switch 9 is turned on while the main control circuit 201 waits (YES in step #50), a still picture image for recording is taken by controlling the size (or area) of the aperture mechanism and the charge storage time of the image pickup device 303. At this time, an aperture control value AVc for controlling the aperture mechanism is obtained by adding a compensation aperture value ΔAV corresponding to the difference time value ΔTVa to an initial aperture value AVi (step #52). Furthermore, the aperture control value AVc is compared with an open aperture value $AV_0$ of the taking lens 301 and judged whether the aperture control value AVc is smaller than the open aperture value $AV_0$ or not (step #54). If the aperture control value AVc is smaller than the open aperture value $AV_0$, the exposure cannot be controlled by the aperture mechanism.

When AVc=AVi+ΔAV<$AV_0$ (YES in step 54), the open aperture value $AV_0$ is set as the aperture control value AVc (step #56), and an error component ΔTVe which cannot be controlled by the aperture mechanism is set as the compensation gain $\Delta TV_G$. A gain G adding the error component ΔTVe to the initial gain $Gr_0$ is set to the AGC circuit 307b (step #58). After that, the main control circuit 201 starts to control the exposure of the image pickup device 303 (step #62). These processes compensates the density of the image by amplifying the image signals by the error component ΔTVe (=EV−$AV_0$−TVc) when the proper exposure light quantity cannot be obtained by setting the open aperture value $AV_0$ of the taking lens 302 and the smallest exposure control time value TVc (the longest charge storage time) of the image pickup device 303. However, it is supposed these scene is few and the error component ΔTVe is small. Thus, the process in step #58 can be omitted.

Alternatively, when AVc=AVi+ΔAV≧$AV_0$ (NO in step 54), the initial value of the gain $Gr_0$ is set as the gain G of the AGC circuit 307b (step #60), and the main control circuit 201 starts to control the exposure of the image pickup device 303 (step #62). After passing the exposure control time t' corresponding to the exposure control time value TVc has been passed, and the exposure of the image pickup device 303 is finished (YES in step #64), the image signals are read from the image pickup device 303 (step #66). The image signals are processed by the signal processing circuit 307, the A/D converter 205, the BLC circuit 206, the WB circuit 207 and the γ compensation circuit 208 (step #68).

Subsequently, the image data for recording are formed by the recording image data forming portion 201d (step #70), and the image data are transmitted to the memory card recorder so as to be recorded in the memory card 17 (step #72). When the image data are recorded in the memory card 17, the image pickup operation is finished. The main control circuit 201 returns to step #2 for standing by the next image pickup operation.

As mentioned above, the camera 1 of the embodiment can be controlled the exposure value EV by the exposure control step ΔEV of 1/8 (0.125EV). In the viewfinder display of the camera 1 of the embodiment, the size or area of the aperture mechanism is immovably fixed and the exposure time or the charge storage time of the image pickup device 303 is controlled. When the difference time value ΔTVa between the proper exposure time value TVp and the actual exposure control time value TVc is larger than the exposure control step ΔEV, the insufficient exposure light quantity corresponding to the difference time value ΔTVa is compensated by amplifying the image signals. As a result, the image with proper density is displayed on the monitor display 10 without reduces the processing speed of the viewfinder.

Furthermore, in the still picture image pickup operation, not only the size of the aperture mechanism but also the exposure time of the image pickup device 303 are controlled for obtaining the proper exposure, so that a high accuracy exposure control can be realized.

Furthermore, it is possible that an immovable aperture is used in the taking lens 301, and the exposure control in the still picture image pickup operation is controlled by controlling not only the exposure control time value TVc but also the compensation gain $\Delta TV_G$.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image pickup apparatus comprising:
   an image sensor for photo-electrically converting optical energy of an image of an object to electric signals;
   a detector for sensing a luminance of the object;
   a first setter for setting a first exposure time which is calculated by integral multiply of a first time unit corresponding to the luminance sensed by the detector;
   a second setter for setting a second exposure time which is calculated by integral multiply of a second time unit shorter than the first time unit corresponding to the luminance sensed by the detector;
   a calculator for calculating a value of signal amplification due to a difference between the first exposure time and the second exposure time; and
   an amplifier for amplifying image signals obtained by exposing the image sensor by the first exposure time based on the value of the signal amplification calculated by the calculator.

2. The image pickup apparatus in accordance with claim 1 further comprising a display for displaying an image by using the image signals amplified by the amplifier.

3. The image pickup apparatus in accordance with claim 2, wherein the display serves as a viewfinder, and the amplifier amplifies the image signals only when the image is displayed for the viewfinder.

4. The image pickup apparatus in accordance with claim 1, wherein the first time unit is a scanning time for one horizontal line of the image sensor.

5. An image processing method for an image pickup apparatus comprising the steps of:
   photo-electrically converting optical energy of an image of an object to electrical signals;
   sensing a luminance of the object;
   setting a first exposure time by integral multiply of a first time unit corresponding to the luminance of the object;
   setting a second exposure time by integral multiply of a second time unit shorter than the first time unit corresponding to the luminance of the object;
   calculating a value of signal amplification due to a difference between the first exposure time and the second exposure time; and
   amplifying image signals obtained by exposing an image sensor by the first exposure time based on the value of the signal amplification.

* * * * *